W. ADAMS.
DEVICE FOR REMOVING THE BLOW-OVER FROM GLASSWARE.

No. 170,798. Patented Dec. 7, 1875.

Witnesses

Inventor
William Adams
by Bakewell & Kerr
Attys

UNITED STATES PATENT OFFICE.

WILLIAM ADAMS, OF PITTSBURG, PENNSYLVANIA.

IMPROVEMENT IN DEVICES FOR REMOVING THE BLOW-OVER FROM GLASSWARE.

Specification forming part of Letters Patent No. 170,798, dated December 7, 1875; application filed October 15, 1875.

*To all whom it may concern:*

Be it known that I, WILLIAM ADAMS, of Pittsburg, in the county of Allegheny and State of Pennsylvania, have invented a new and useful Improvement in Devices for removing the "Blow-Over" from Glassware; and I do hereby declare the following to be a full, clear, and exact description thereof, reference being had to the accompanying drawing forming a part of this specification, in which—

Figure 1:
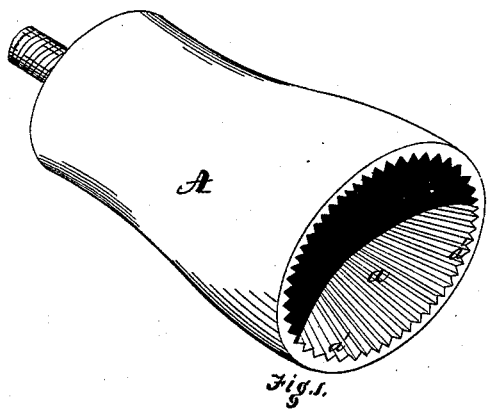
Figure 2:
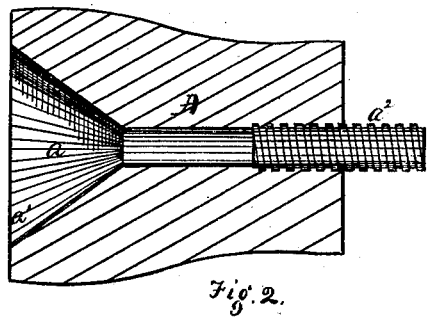
Figure 3:
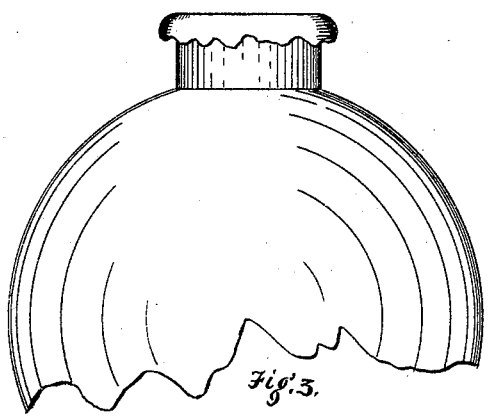
Figure 4:
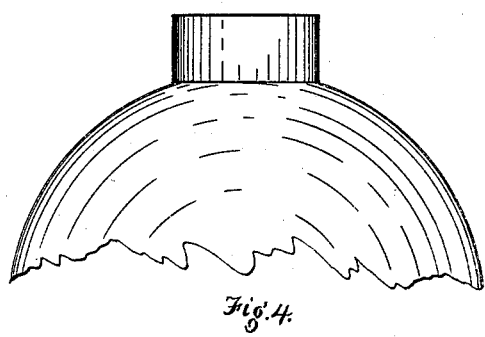

Figure 1 is a perspective view of my device. Fig. 2 is a sectional view of the same. Fig. 3 is an illustration of a piece of glassware, showing the blow-over, which the tool is intended for removing; and Fig. 4 is a view of the same, the blow-over having been removed.

Like letters refer to like parts wherever they occur.

My invention relates to the means employed for removing what is termed the "blow-over" from blown-glass articles; and it consists in a tool having a tapering or cone-shaped cavity, provided with corrugations or cutting-surfaces for removing the blow-over from the glass article.

In the manufacture of lamps and various other blown-glass articles there is formed, at the point next to the blow-pipe, a thin flaring irregular edge, which it is necessary to remove in order to put on the cap or collar with which such articles are provided. This blow-over has heretofore been generally removed by using a small saw-blade, with which the operator hacked or sawed off the irregular edge, and a skillful person might, in this manner, remove the blow-over from, perhaps, one thousand (1,000) or one thousand two hundred (1,200) small articles in the course of a day. The object of the present invention is to supply a tool by which this work can be done better and more rapidly.

In the drawing, A represents the tool or block, having a cavity, $a$, preferably cone-shaped, as shown, so as to operate upon articles of different sizes, said cavity being provided with corrugations or cutting-surfaces $a^1$ for removing the blow-over. This block A has a screw or other device, $a^2$, by means of which it may be secured in a lathe, though other means may be employed for revolving the block.

The device is made of cast-steel or other suitable hard material, and is employed as follows: The device being secured in a lathe is revolved rapidly, and the article having the blow-over, as, for instance, a lamp-bowl, is held within the cavity, and brought in contact with the cutting-surfaces $a^1$, which remove the blow-over rapidly and regularly.

The advantages of my invention are that it lightens the labor and enables a greater amount of work to be done. With a tool of the kind described one person can remove the blow over from between ten and twelve thousand lamp-bowls in one day.

Having thus described my invention, what I claim, and desire to secure by Letters Patent, is—

A device for removing the blow-over from glassware, said device having a cone or similar shaped cavity, provided with corrugated or cutting surface, substantially as specified.

In testimony whereof I, the said WILLIAM ADAMS, have hereunto set my hand.

WILLIAM ADAMS.

Witnesses:
D. WENKE,
JAS. DALZELL.